M. SAULSON.
BUCKET EARS.
No. 179,353. Patented June 27, 1876.
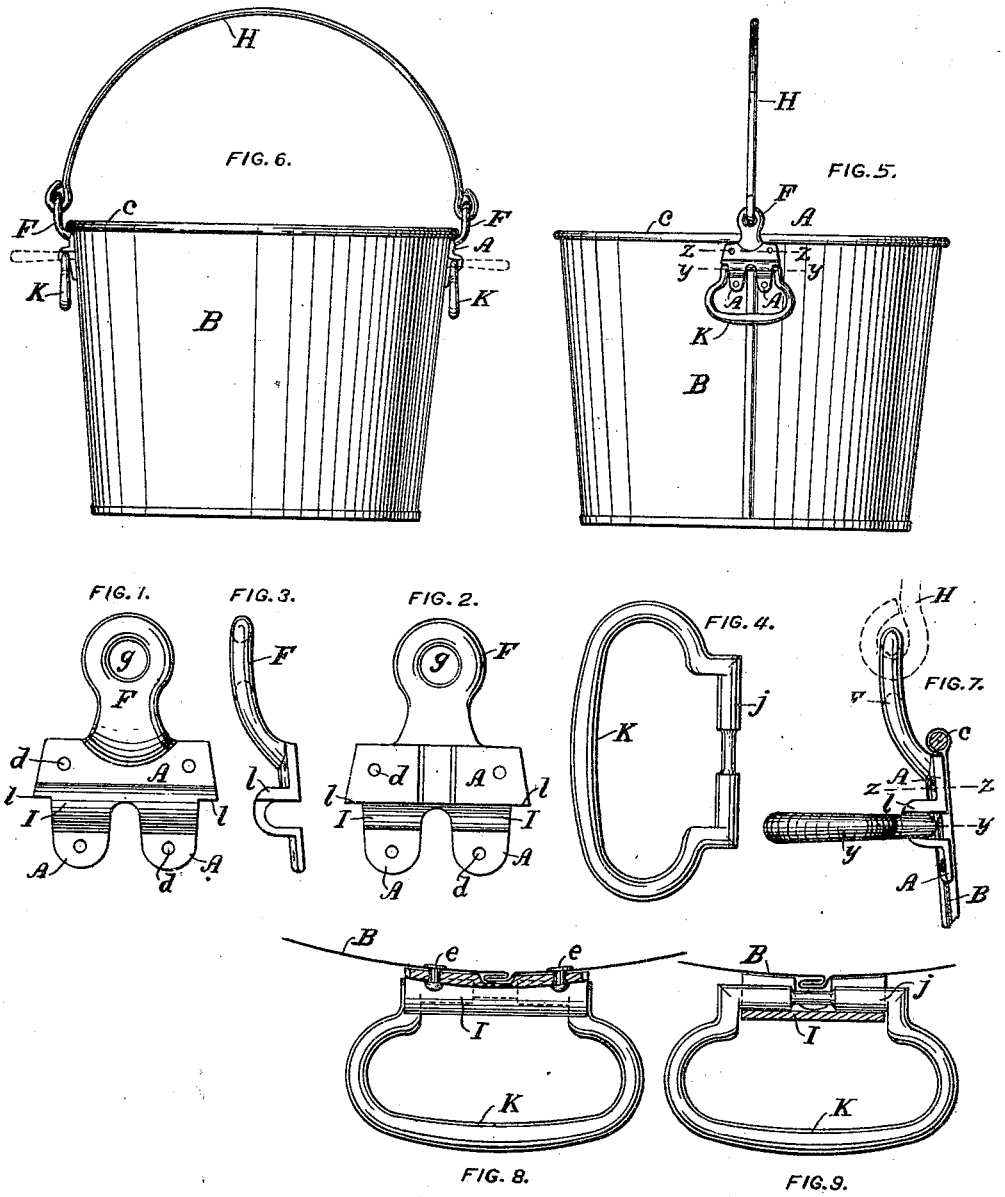

UNITED STATES PATENT OFFICE.

MORITZ SAULSON, OF TROY, NEW YORK, ASSIGNOR TO MINNE SAULSON, OF SAME PLACE.

IMPROVEMENT IN BUCKET-EARS.

Specification forming part of Letters Patent No. 179,353, dated June 27, 1876; application filed June 3, 1876.

*To all whom it may concern:*

Be it known that I, MORITZ SAULSON, of the city of Troy, in the county of Rensselaer and State of New York, have invented a new and useful Combined Bail-Ear and Handle-Socket for Wash-Boilers, and other pail-like vessels, of which the following is a specification, reference being had to the accompanying drawing.

This invention consists, primarily, of a combined bail-ear and handle-socket having a fastening-plate, which can be secured by rivets to the upper part of a sheet-metal wash-boiler or pail-like vessel next to the rim of the latter, a perforated bail-ear extended beyond the said fastening-plate so as to receive and retain one end of a swinging bail above the rim of the boiler or vessel to which the fastening-plate shall be secured, and a handle-socket formed with projecting stop-bearings for the reception and retention in proper position of a simple bow-shaped swinging lifting-handle, all constructed, arranged, and combined as hereinafter described.

In the aforesaid drawing, Figure 1 is an elevation of the outer side, Fig. 2 an elevation of the inner side, and Fig. 3 an edge elevation, of a combined bail-ear and handle-socket made according to this invention; and Fig. 4 is a plan of a handle suitable for use in connection therewith. Fig. 5 is an elevation of a wash-boiler, showing in side view my improved combined bail-ear and handle-socket with a handle and bail applied thereto; and Fig. 6 is an elevation of the same wash-boiler, showing two of the bail-ears and handle-sockets, with handles in edge elevation. Fig. 7 shows in edge elevation the same bail-ear and handle-socket, with handle applied to the upper part of one side of a wash-boiler of sheet metal shown in section. Fig. 8 is a horizontal section at the line $z\ z$ in Figs. 5 and 7, and Fig. 9 a horizontal section at the line $y\ y$ of the same figures, of a part of a wash-boiler with my improved bail-ear and handle-socket secured thereto, and showing in plan a lifting-handle in the socket of the bail-ear.

A is a plate which is shaped to fit upon the outer side of the upper portion of the sheet-metal body B of a pail-like wash-boiler next to the rim $c$ thereof, and is formed with perforations $d$, Figs. 1 and 2, so that it can be readily and firmly secured by rivets $e$, Fig. 8, to a correspondingly-perforated part of the sheet-metal body. F is the ear which extends beyond the plate A, and has an eye, $g$, to receive a bent end of a bail, H, so that when the plate A shall be fastened to the body B of the vessel next to its rim $c$, the bail-eye $g$ in the ear shall then be above the rim of the vessel, as is generally the required case in pail-like wash-boilers. I is a socket which is formed by the outward bowing of the plate A, so as to receive the journal-part $j$ of a simple bow-shaped or link-like swinging handle K, and thereby retain the latter when the plate A is fastened to the body B of the pail-like vessel. The upper end parts of the socket I extend or project laterally beyond the lower portions thereof, so as to form stops $l\ l$, and permit the handle K to hang down out of the way, as shown in full lines in Figs. 5 and 6, when the handle is not in use; and so that the stops $l\ l$ shall cause the handle K to firmly stand or project out horizontally or laterally, as shown in Figs. 7 and 8, so as to be convenient to the hand while the handle shall be used in lifting or carrying the vessel.

By the aforesaid construction, the plate A, ear F, socket I, and stop-bearings $l\ l$ can all be cast together in one and the same piece of metal, and at only very little, if any, more expense than an ordinary bail-ear having a fastening-plate of like size and strength, and the ear extended beyond the plate, but without the handle-socket in the plate; and, at the same time, no lugs or projections are required to be formed on the swinging lifting-handle to prevent it from turning upward beyond a horizontal or nearly horizontal position when the handle is in use.

What I claim as my invention is—

The combined bail-ear and handle-socket having the fastening-plate A, bail-ear F extended beyond the fastening-plate, and the socket I with the projecting stop-bearings $l\ l$ for holding the swinging lifting-handle K, all constructed, arranged, and combined as set forth.

In testimony whereof I hereunto set my hand in the presence of two subscribing witnesses this 31st day of May, 1876.

MORITZ SAULSON.

Witnesses:
AUSTIN F. PARK,
JAMES T. GOODFELLOW.